United States Patent
Lloyd et al.

(10) Patent No.: US 11,884,195 B2
(45) Date of Patent: Jan. 30, 2024

(54) HEADREST

(71) Applicant: GEORGE TFE SCP, Monaco (MC)

(72) Inventors: John George Lloyd, Monaco (MC); Piers Christian Storey, Monaco (MC)

(73) Assignee: GEORGE TFE SCP, Monaco (MC)

( * ) Notice: Subject to any disclaimer, the term of this patent is extended or adjusted under 35 U.S.C. 154(b) by 0 days.

(21) Appl. No.: 18/246,379

(22) PCT Filed: Oct. 25, 2021

(86) PCT No.: PCT/IB2021/059842
§ 371 (c)(1),
(2) Date: Mar. 23, 2023

(87) PCT Pub. No.: WO2022/090905
PCT Pub. Date: May 5, 2022

(65) Prior Publication Data
US 2023/0302983 A1    Sep. 28, 2023

(30) Foreign Application Priority Data

Oct. 29, 2020  (EP) .................................. 20020501

(51) Int. Cl.
*B60N 2/70*    (2006.01)
*B60N 2/888*   (2018.01)

(52) U.S. Cl.
CPC ........... *B60N 2/888* (2018.02); *B60N 2/7094* (2013.01)

(58) Field of Classification Search
CPC ........ B60N 2/885; B60N 2/882; B60N 2/888; B60R 21/04
See application file for complete search history.

(56) References Cited

U.S. PATENT DOCUMENTS

| | | | | |
|---|---|---|---|---|
| 4,440,443 A | * | 4/1984 | Nordskog | B60N 2/882 297/217.4 |
| 5,306,066 A | * | 4/1994 | Saathoff | B60J 5/0451 296/187.05 |
| 5,819,408 A | * | 10/1998 | Catlin | B62D 21/15 296/205 |
| 5,836,547 A | | 11/1998 | Koch | |
| 6,250,713 B1 | | 6/2001 | Grohs | |
| 9,725,020 B2 | * | 8/2017 | Fainello | B60J 5/045 |

(Continued)

FOREIGN PATENT DOCUMENTS

GB    2271534 A    4/1994

OTHER PUBLICATIONS

Autosport: "Lewis Hamilton's Baku F1 headrest problem explained", YouTube, Aug. 4, 2017 (Aug. 4, 2017), pp. 1-3, XP054981563, Retrieved from the Internet: URL: https://www.youtube.com/watch?v=SSbFsInHZGC [retrieved on Mar. 17, 2021] * the whole document *.

*Primary Examiner* — Shin H Kim
(74) *Attorney, Agent, or Firm* — Jason Lee DeFrancesco (57) ABSTRACT

Headrest (1) for a racing vehicle (10) comprising a cockpit (11) wherein a driver (20) wearing a helmet (30) can sit, comprising a flexible casing (2) configured to be anchored to a vehicle body (12) and at least one energy-absorbing member (3) comprising at least one honeycomb cellular structure (9) arranged inside said casing (2). The energy-absorbing member (3) further comprising a foam pad (8) shaped so as to hold the at least one honeycomb cellular structure (9).

18 Claims, 4 Drawing Sheets

(56) References Cited

U.S. PATENT DOCUMENTS

| | | | |
|---|---|---|---|
| 10,040,379 B2* | 8/2018 | Dellanno | B60N 2/4207 |
| 11,008,106 B2* | 5/2021 | Parrilla Calle | B60N 2/888 |
| 2012/0139309 A1* | 6/2012 | Gaither | B60N 2/882 |
| | | | 297/391 |
| 2016/0200226 A1* | 7/2016 | Dellanno | B60N 2/888 |
| | | | 297/216.12 |
| 2016/0272327 A1* | 9/2016 | Baker | B64D 11/06 |
| 2016/0304006 A1* | 10/2016 | Fainello | B60J 5/0401 |
| 2020/0346758 A1* | 11/2020 | Parrilla Calle | B60N 2/856 |
| 2022/0234483 A1* | 7/2022 | Tate Morgan | B60N 2/686 |
| 2023/0011532 A1* | 1/2023 | Storey | A42B 3/125 |

\* cited by examiner

Fig. 7D
SECTION B-B

SECTION A-A
Fig. 7E

HEADREST

TECHNICAL FIELD

The present invention relates to the field of energy absorption apparatuses for protecting occupants of vehicles from impacts. In particular, the headrest protects the head of a driver from impacts against the cockpit in case of an accident or very high levels of acceleration and deceleration.

BACKGROUND ART

In the state of the art are known some types of headrest. For example, in the F1 (formula one) races, the headrest is normally used. This headrest comprises a casing in which foam pads are fitted. This casing is secured to the car body with fast connectors. An example of this kind of headrest is disclosed in the video: Autosport: "Lewis Hamilton's Baku F1 headrest problem explained", YouTube, 4 Aug. 2017 (2017-08-04), pages 1-3, XP054981563, Retrieved from the internet: URL: https://www.youtube.com/watch?v=SSbFsInHZGc.

Since the foam is temperature sensitive, two type of foam specifications are foreseen in the F1 competitions. Before each race, the FIA (Fédération Internationale de l'Automobile) decides which type of foam specification needs to be used during the race: pink foam is used for temperatures below 30° C., and blue foam is used for temperature above 30° C. When the foam becomes warmer, it becomes softer and consequently the casing of the headrest can easily deform. Under the low pressure created by the wind flowing on the car during a race, the casing tends to deform and lift and, in extreme circumstances, it can be sucked out of the cockpit. In this case, the driver is obliged to grab the headrest and put it back in the right position, wasting time. In the worst cases, the driver is obliged to go to the pit for substituting the headrest. In particular, this kind of problem occurs when the temperature changes during a race +/−10° C. from the 30° C. threshold.

No solutions are actually available to solve this problem. No type of headrest is available that can be used in every temperature condition without detriment to safety standards for the driver. Furthermore, there is no type of headrest available that is safer than the currently available headrests employing expanded foams, under the same weight. Finally, the temperature variations appreciably impair the mechanical properties of current foams, with the consequent worsening of energy absorption capacity of the headrest.

SUMMARY

A first scope of the present invention is that of solving said and other inconveniences of the state of the art by means of a headrest for vehicles, in particular for fast vehicles. This headrest is suitable for vehicles comprising a cockpit wherein a driver can sit, for example racing vehicles. The term "cockpit" means the section of the vehicle's chassis in which the driver sits. In the racing vehicles, the driver usually wears a helmet. The headrest comprises a flexible casing configured for being anchorable to a vehicle body through connecting means and at least one energy-absorbing member arranged inside said casing. The energy-absorbing member comprises at least one honeycomb cellular structure. The headrest also comprises at least one foam pad shaped so as to hold the at least one honeycomb cellular structure so that it's kept in the flexible casing. This kind of headrest is lighter and stable to temperature variations. Since the foam is easier to shape, the foam pad can easily achieve geometries that fit with the inner side/s of the casing. On the contrary, the honeycomb cellular structure is more difficult to be shaped and it's better if it assumes regular shapes. The present headrest can be also employed in racing cars, jet aircrafts or space shuttles.

The honeycomb cellular structure can comprise a plurality of interconnected open cells configured to absorb energy by plastic deformation in response to a longitudinal compressive load applied to said cells. Preferably each cell is a tube comprising a sidewall and a longitudinal axis, and the cells are connected each other through their sidewalls. Being the cells opened, the honeycomb cellular structure is very light and breathable. If the cells would be closed, the energy-absorbing member could generate rebounding forces.

Preferably, the longitudinal axes of the cells belonging to the same honeycomb cellular structure are parallel each other. This permits to have a uniform absorption of energy according to predetermined directions of impact.

Advantageously, the longitudinal axes of the open cells are oriented so that, when the helmet of the driver hits the casing, said cells are compressed along said longitudinal axes against the vehicle body. This kind of orientation of cells permits a buckling of cells along their longitudinal axes like a bellows.

More advantageously, the longitudinal axes of the cells are horizontal and oriented toward the driver sitting in the cockpit. In particular, towards its helmet. The longitudinal axes of the cells can be oriented according to a left-and-right direction or to a front-and-back direction. In particular, the lateral honeycomb cellular structures can comprise cells having longitudinal axes oriented according to a left-and-right direction, while the honeycomb cellular structure behind the helmet can comprise cells having longitudinal axes oriented according to a front-and-back direction. In this way, the impact absorption is optimized.

In particular, the longitudinal axes of the cells can be normal to a surface of the casing facing the helmet of the driver sitting in the cockpit. This arrangement of cells with respect to the casing allows a uniform distribution of forces due to an impact.

Alternatively, the longitudinal axes of the cells can be inclined of an angle that is smaller or equal to 45° with respect to a direction normal to a surface of the casing facing the helmet of the driver sitting in the cockpit. Preferably, the longitudinal axes are inclined of an angle comprised between 5° and 35°. These axes are angled to reduce the initial compressive strength peak of the honeycomb and allow it to compress at lower energies when the helmet hits the headrest, reducing the resultant force transmitted to the driver's head. Furthermore, when the axes are angled, the honeycomb cellular structure slightly shifts laterally. This phenomenon increases the duration of the compression and the impact lasts a few milliseconds longer, reducing the maximum deceleration of the head.

Preferably, the honeycomb cellular structures are at least three, at least one first honeycomb cellular structure is arranged in a portion of the flexible casing lying behind the helmet of the driver sitting in the cockpit and at least two second and third honeycomb cellular structures are respectively arranged in right and left portions of the flexible casing lying on the sides of the helmet of the driver sitting in the cockpit, when the headrest is viewed from above. This arrangement of honeycomb cellular structures optimized the absorption of lateral and back impacts.

Advantageously, the at least one foam pad comprises a recess to accommodate the at least one honeycomb cellular structure. The foam pad is used as an interface for receiving the honeycomb cellular structure in the casing. To hold the honeycomb cellular structure relative to the flexible casing, the at least one foam pad can be externally shaped so as to match at least in part with inner side of the flexible casing.

In particular, the honeycomb cellular structure can comprise an upper and/or lower sheet layer. Preferably, said sheet layer is connected to front edges of said open cells through a heat-activated adhesive. This thin layer permits to spread the load of an impact over a larger number of cells. The sheet layer can be a fabric layer.

Preferably, the casing of the headrest is shaped so as to partially surround the helmet of the driver sitting in the cockpit when the headrest is viewed from above. The headrest is preferably shaped so as to protect the driver from lateral and rear impacts that could occur between the helmet and the cockpit. In particular, the headrest is shaped so as to cover all parts of the cockpit against which the helmet can impact.

The casing preferably comprises a thin and flexible layer made of a composite material. The composite material can be Kevlar. This composite material provides a great flexibility and resistance to the casing. Furthermore, it's very light. This flexible layer represents the outer skin of the headrest, which protects and contains the energy-absorbing member/s. The outer layer is smooth, consequently it can be customized and coloured.

The headrest can comprise connecting means configured to fix it to the vehicle body or to the cockpit. These connecting means can comprise: at least one quick-lock connector connected to the casing and configured to reversibly fixe the casing to the vehicle body; and/or one or more male/female connectors configured to engage respective one or more female/male elements belonging to the car, so as to realize male-female connection/s. These kind of connecting means are reversible and allow a quick disconnection of the headrest from the vehicle body, in case of emergency.

A second scope of the present invention is that of providing a racing car having an open or closed cockpit, wherein a driver wearing a helmet can sit, and a headrest anchored to the car body according to the first scope of the present invention.

These and other advantages will be better understood thanks to the following description of different embodiments of said invention given as non-limitative examples thereof, making reference to the annexed drawings.

DRAWINGS DESCRIPTION

In the drawings:

FIG. 9 shows cross-sectional views of a portion of the headrest wherein the foam pad and the honeycomb cellular structure are arranged in three different positions;

DETAILED DESCRIPTION

The following description of one or more embodiments of the invention is referred to the annexed drawings. The same reference numbers indicate equal or similar parts. The object of the protection is defined by the annexed claims. Technical details, structures or characteristics of the solutions herebelow described can be combined with each other in any suitable way.

Almost all annexed drawings have Cartesian axes, wherein the front, back, up, down, left and right directions are indicated by the first letter of their names.

Figure 1:
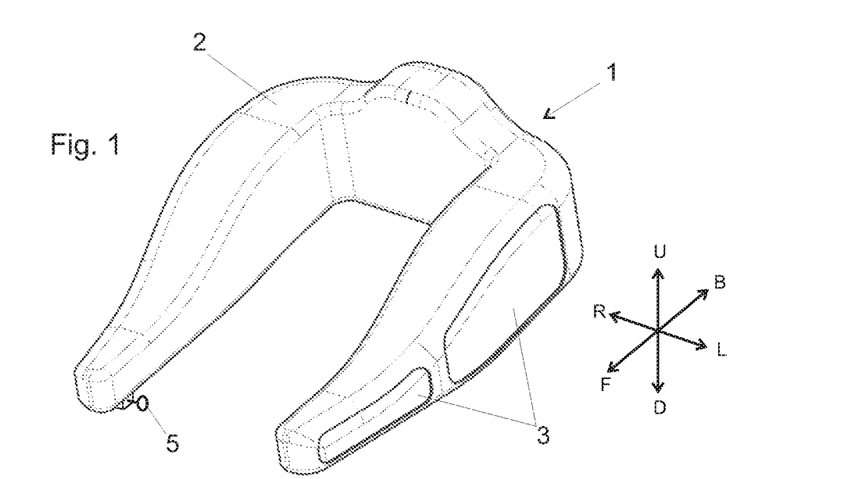
FIG. 1 shows an isometric-front view of the headrest according to the present invention.
Figure 2:
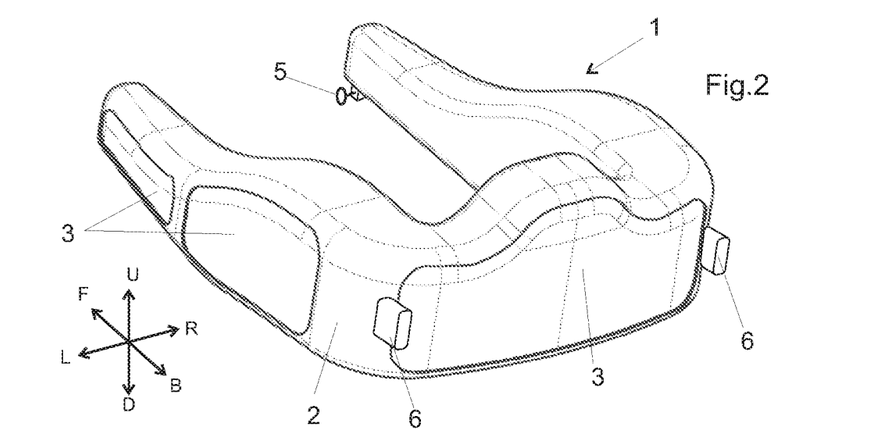
FIG. 2 shows an isometric-back view of the headrest of FIG. 1.
Figures 5, 6:
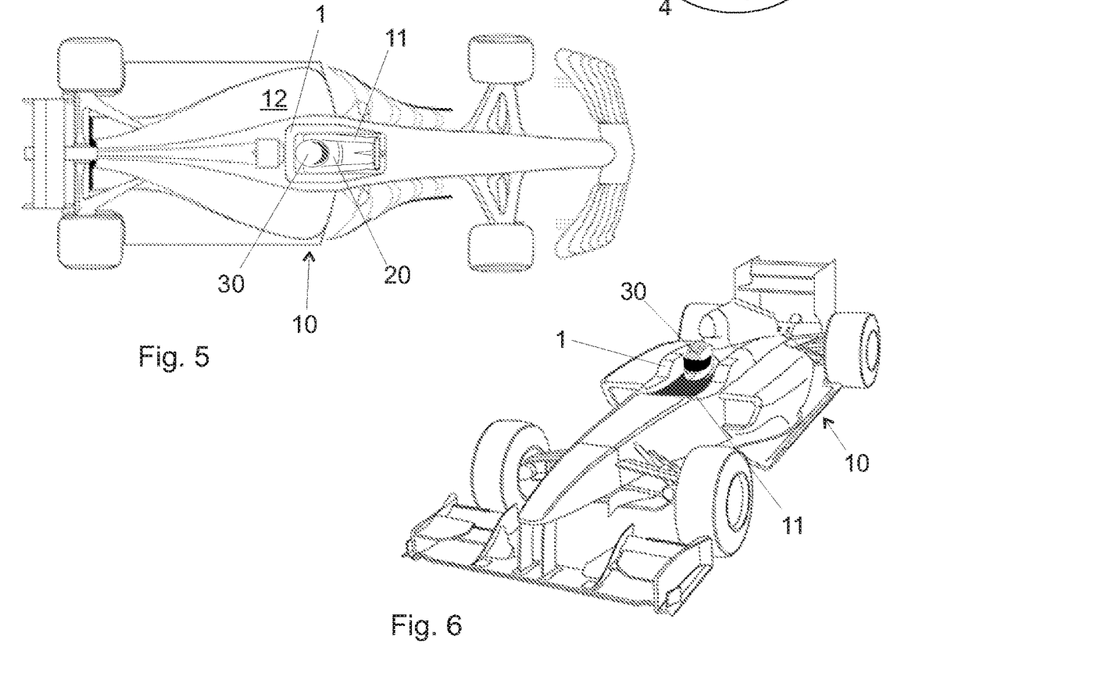
FIG. 5 shows a top view of a racing car according to the present invention.
FIG. 6 shows a perspective front view of a racing car according to the present invention.

FIGS. 1-2 represent a headrest for a race car, like a F1 ("Formula 1") car (see FIGS. 5-6). The headrest is U-shaped if it's observed from above. In F1 cars, the headrest is U-shaped for surrounding the helmet of the driver sitting in the cockpit of the car, as shown in FIGS. 3, 5 and 6.

As represented in FIGS. 1 and 2, the headrest for these kinds of cars comprises two lateral portions connected each other through a back portion, so as to form said U-shaped item. The lateral portions are thicker and higher in proximity of the back portion and taper moving towards their distal ends. The back portion of the headrest is normally taller than the lateral portions, in particular in the middle.

The headrest according to the present invention can be used in open-cockpit cars, like F1 cars, or in close-cockpit cars, like the LMP ("Le Mans Prototype") cars. In both cases, the shape of the headrest is similar. Anyway, the headrest of present invention can assume a different shape, without departing from the scope of the invention.

Figure 3:
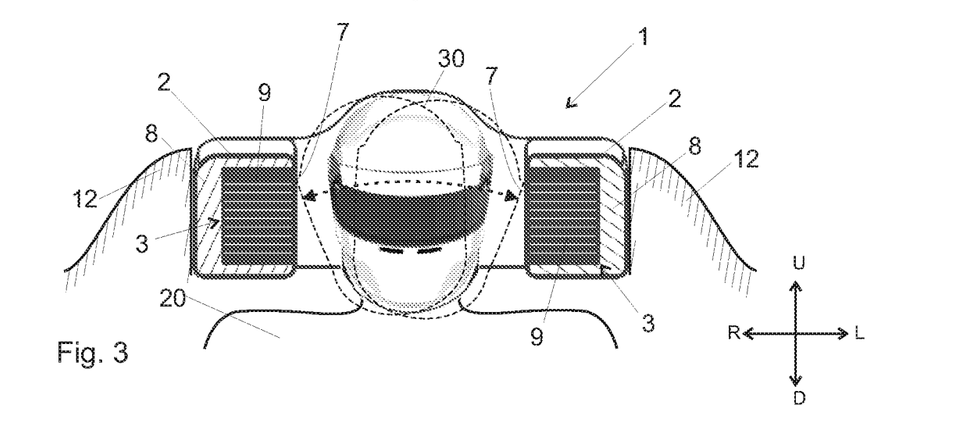
FIG. 3 shows a cross-sectional view of the headrest of FIG. 1 arranged on a vehicle.

As FIG. 3 shows, the headrest 1 is normally arranged on the car body 12 at the same height of the driver's helmet 30 so as to minimize the lateral/back movements of the head in case of a strong lateral/front acceleration/deceleration. A wide space between the helmet 30 and the headrest 1 would cause dangerous movements to the spine of the driver 20. The headrest 1 substantially surrounds behind and beside the helmet 30 of the driver 20. Normally the sudden forward movements of the helmet are limited by means of other devices, like the HANS (Head And Neck Support). Despite this, the headrest 1 has an elongated shape for protecting the driver 20 also from diagonal-forward impacts of the helmets 30 and for protecting other parts of the driver body, like arms and hands.

The headrest 1 according to the present invention comprises a flexible casing 2 that is configured for being anchored to a car body 12. Term "vehicle body" or "car body" mean any part of the vehicle/car body wherein the headrest can be attached and are used as synonyms. Alternatively, the casing 2 can be anchored to a portion of the cockpit 11. The headrest 1 can be shaped so as to follow the outer shape of the outer body of the car, in order to minimize the aerodynamic resistance and camouflage the headrest 1 with the rest of the car 10.

The headrest 1 comprises at least one quick-lock connector 5 for anchoring the casing to the vehicle body 12 in a reversible manner, as represented in FIGS. 1 and 2. Two quick-lock connectors 5 can be arranged in the front of the headrest 1, in a position that is easily accessible to the driver 20. The quick-lock connectors 5 can be fixed to the casing 2. The headrest 1 also comprises two male connectors 6 configured to couple corresponding female elements (not illustrated) belonging to the vehicle body 12, when the headrest 1 is engaged with the vehicle body 12. The male connectors 6 are arranged on the back of the headrest 1. When the quick-lock connectors 5 are disengaged from the vehicle body 12, the headrest 1 can be easily moved away from the cockpit 1.

The casing 2 is preferably made of a composite material like Kevlar, so as to be light and resistant. In order to be deformable, only two or three layers of para-aramid fibres are used. Consequently, the outer skin of the headrest 1 remains thin, resistant and flexible. Alternatively, the flexible casing 2 can be made of any other composite materials such as carbonfibre, glassfibre or Dyneema® or a polymeric material which permits a deformation, like ABS, PE or PC. The casing 2 has inner faces, facing the driver, that are continuous and smooth. Even the upper face is continuous and smooth. On the contrary, the opposite sides can have one or more passages 17 for permitting the entrance of one or more energy-absorbing members 3. Preferably, the energy-absorbing members 3 are inserted from the bottom of the casing 2, through the passages 17, visible in FIG. 4. Once the energy-absorbing members 3 are inserted in the casing 2, one or more apertures 14, visible in FIGS. 1, 2 and 4, clamp the energy-absorbing members 3, preventing their separation from the casing.

The energy-absorbing members 3 are the elements configured for absorbing the energy of an impact of the helmet against the casing 2. The energy-absorbing members 3 are entirely contained in the flexible casing 2 for improving handling of the headrest 1.

The energy-absorbing member 3 comprises at least one honeycomb cellular structure 9. In a first embodiment, represented in FIGS. 3, 4 and 7, the energy-absorbing member 3 comprises one or more foam pads 8 and one or more honeycomb cellular structures 9. In a second embodiment, represented in FIGS. 8, the energy-absorbing member 3 is entirely constituted by the honeycomb cellular structure 9.

Figure 4:
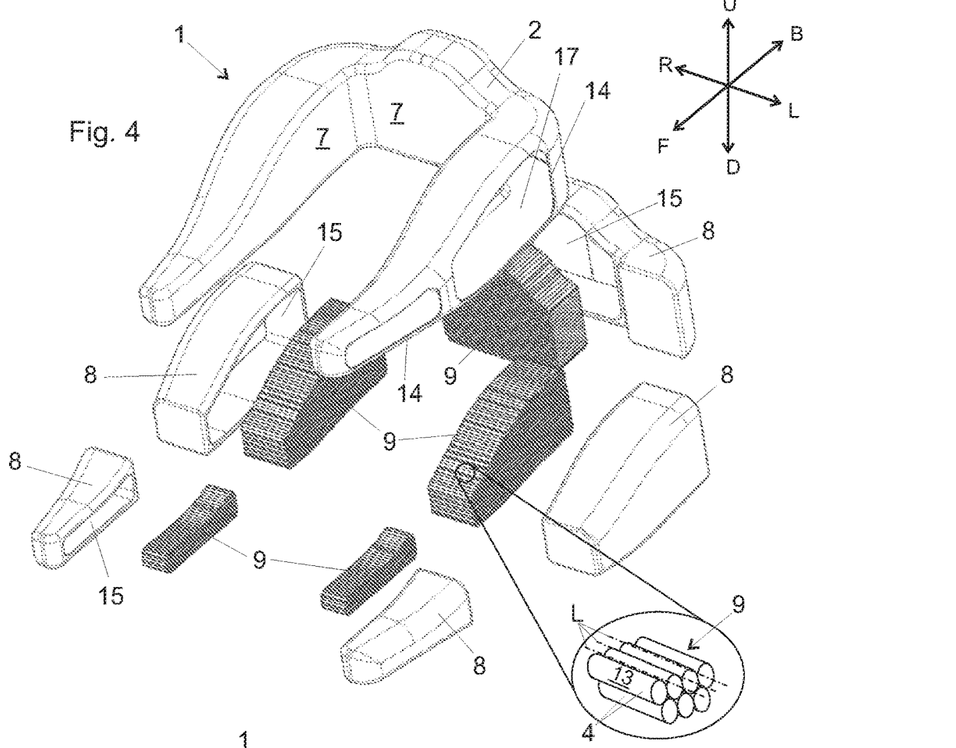
FIG. 4 shows an exploded view of the headrest of FIG. 1.

In the first embodiment, one or more foam pads 8B,8R, 8L,8R',8L' are externally shaped so as to mate with the inner side of the casing 2, as represented in FIG. 4. Each foam pad 8 comprises an inner cavity or recess, wherein the honeycomb cellular structure 9 is accommodated, as represented in FIG. 4. The cavity/recess 15 allows the foam pad 8 to hold the honeycomb cellular structure 9 in position. This cavity/recess 15 has a regular shape so as to admit honeycomb cellular structures 9 having more regular shapes, like parallelepipeds. The foam of the foam pad 8 is easier to work than to the honeycomb cellular structure 9, consequently foam pad 8 works as interface for housing the honeycomb cellular structure 9 in the casing 2.

Furthermore, the foam pad 8 can be shaped, as represented in FIGS. 1, 2, 4, so as to engage the outer apertures 14 of the casing 2. This coupling permits to hold the foam pad 8 in the casing 2.

The foam pad 8 can be more than one, as represented in FIG. 4, for facilitating the insertion of the energy-absorbing member 3 in the casing 2. Alternatively, the foam pad 8 can be only one for reducing the volume of foam in the headrest 1. In the first case, the honeycomb cellular structures 9B,9R, 9L,9R',9L' are more than one, specifically at least one per cavity 15. In the second case, the honeycomb cellular structures 9 can be one or more, for example one per side of the headrest 1.

Figures 9A, 9B, 9C, 10, 11:
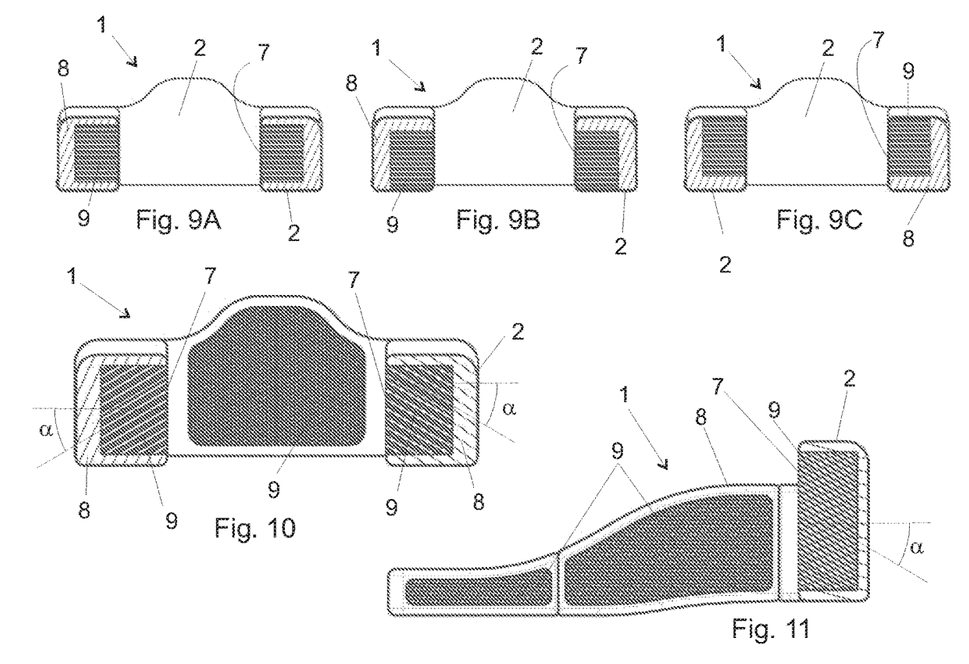
FIG. 10 shows a cross-sectional view of a headrest wherein the cells of the honeycomb cellular structure are inclined according to a first inclination.
FIG. 11 shows a cross-sectional view of an energy-absorbing member 3 wherein the cells of the honeycomb cellular structure are inclined according to a second inclination.

In the foam pad 8, the cavity/recess 15 for accommodating the honeycomb cellular structures 9 is arranged towards the center of the headrest 1, thus towards the zone wherein the helmet 30 of the driver 20 lies. In particular, as represented in FIG. 9A, the recess 15 can be arranged at half height, surrounded by a foam pad 8 having a C-shaped cross-section. Alternatively, the cavity 15 can be arranged upwards, as shown in FIG. 9C, or downwards, as shown in FIG. 9A. The different arrangement of the honeycomb cellular structure 9 with respect to the foam pad 8, allows to differentiate the type of impact absorbed.

The honeycomb cellular structure 9 is preferably made of a plurality of interconnected open cells 4, as shown in the detailed view of FIG. 4. Each cell 4 is configured to absorb energy by plastic deformation in response of a longitudinal compression, thus a compression along its longitudinal axis L. The cell 4 is configured to deform irreversibly, or substantially irreversibly, crumpling on itself. The cell 4 is configured to progressive buckle along its longitudinal axis. The cell 4 is a tube, for this reason, the terms cell and tube can be considered synonyms. Being the cells 4 interconnected, laterally buckling is prevented. Since the cells 4 are connected through their sidewalls 13, each cell 4 sustains the neighbour cells 4 and said lateral collapsing is prevented.

The casing 2 has the function of containing the energy-absorbing members 3 but also the function of spreading the impact, involving a bigger number of cells in the progressive buckling.

Figures 7A, 7B, 7C, 7D, 7E:
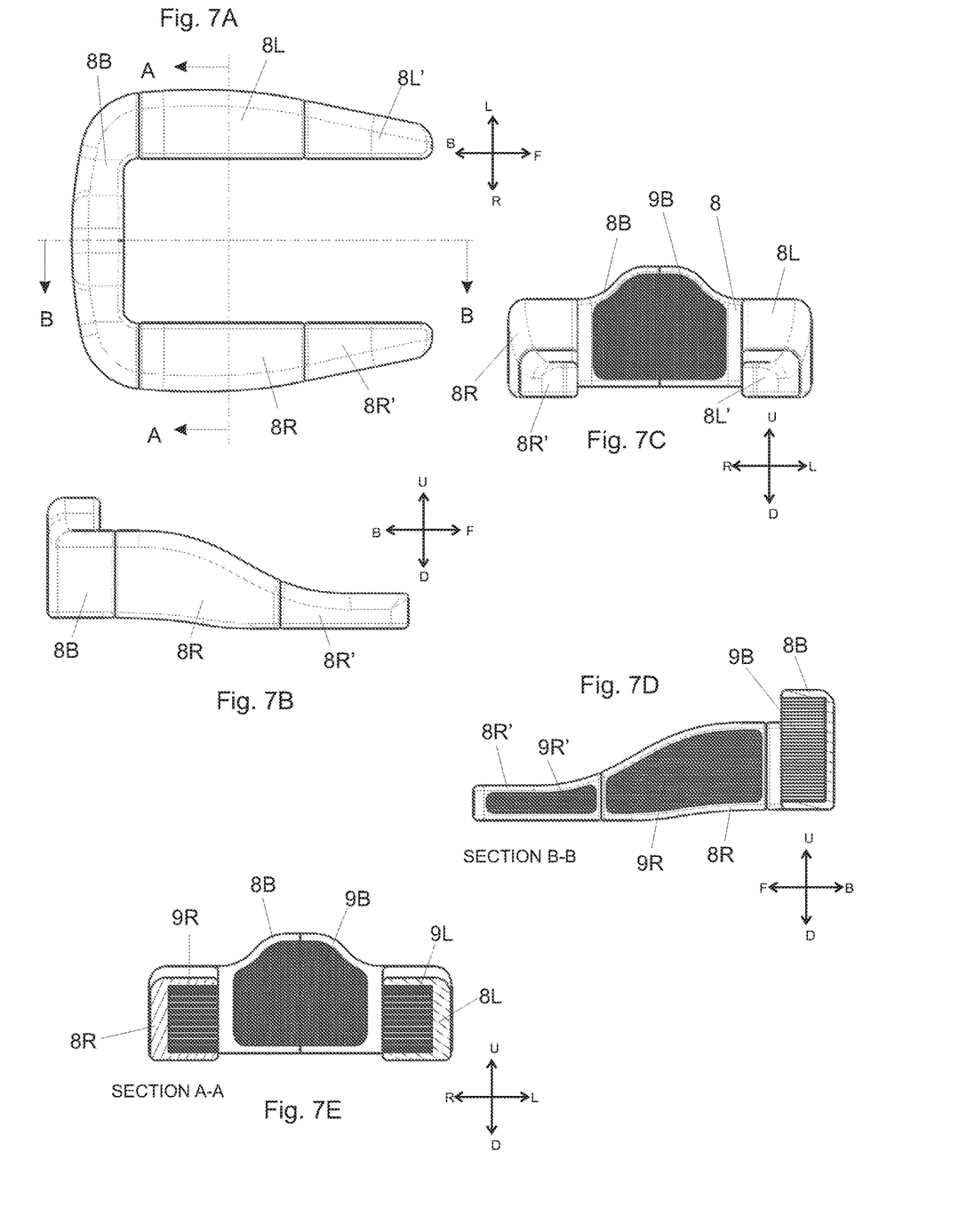
FIG. 7A shows a top view of the energy-absorbing member contained in the headrest of FIG. 1.
FIG. 7B shows a side view of the energy-absorbing member contained in the headrest of FIG. 1.
FIG. 7C shows a front view of the energy-absorbing member contained in the headrest of FIG. 1.
FIG. 7D shows a cross-sectional view of the energy-absorbing member of FIG. 7A, sectioned according to plan B-B.
FIG. 7E shows a cross-sectional view of the energy-absorbing member of FIG. 7A, sectioned according to plan A-A.

As represented in FIGS. 4 and 7, the cells 4 belonging to the same honeycomb cellular structure 9 are parallel to each other. The rear honeycomb cellular structure 9 has cells 4 all oriented according to the front-and-back direction, while the two on each side lateral honeycomb cellular structures 9 have cells 4 all oriented according to the left-and-right direction, as shown in FIGS. 7D and 7E. In this way, the cells 4 are all oriented towards the helmet 30 of the driver 20. In particular, the cells 4 have horizontal longitudinal axes L, thus parallel to the ground. In the embodiment represented in FIGS. 3 and 7, the longitudinal axes L of all cells 4 are oriented so that, when the helmet 30 of the driver 20 hits the casing 2, said cells 4 are compressed against the vehicle body 12. As represented in FIG. 3, the helmet 30 can swing due to lateral accelerations/decelerations and it can strike the casing 2 with violence. In this case, the casing 2 deforms, the foam pad 8 collapses and the honeycomb cellular structure 9 crumples along its height, absorbing the energy of the impact.

The cells 4 can be made of polycarbonate, polypropylene, polyetherimide or polyester, consequently the mechanical behaviour of said cells 4 is substantially constant in the range of temperature −30° C. to +100° C., solving the problem of the current headrest, that needs to be changed in case of temperatures above or below 30° C. Furthermore, the cells/tubes 4 are opened and permit the transit of air through them. The air, flowing through the cells 4, cools down the cells themselves, making the honeycomb cellular structure 9 more stable to temperature variations.

The longitudinal axes L of cells 4 can be normal to the outer surface 7 of the casing 2, as shown in FIGS. 3, 4, 7. The outer surface 7 comprises two lateral and one rear sides that face towards the helmet 30 of the driver 20, as shown in FIG. 3.

Alternatively, the longitudinal axes L of the cells 4 can be inclined of an angle α with respect to said direction normal N to the surface 7 of the casing 2, as shown in FIGS. 10 and 11. In particular, as represented in FIG. 10, the longitudinal axes L are horizontal and inclined with respect to the left-and-right direction by said angle α. In an another version, represented in FIG. 11, the longitudinal axes L of the cells 4 are parallel to the left-and-right direction and inclined with respect to a horizontal plan parallel to the ground by an angle α. In a further version, not shown, the longitudinal axes are inclined with respect to both the left-and-right direction and a horizontal plan. These arrangements of cells 4 permits to reduce the initial peak of strain when the honeycomb cellular structure 9 is compressed. Said angle α can be less than 45°, preferably between 5° and 30°. With these values of the angle α, when a compression is applied orthogonally to the casing 2, the cells 4 are subject to a force having a longitudinal component, that crumples the cells 4 as described above, and an transversal component, that press the cells 4 laterally. The longitudinal component plastically absorbs the energy of the compression, while the orthogonal component deflects the sidewalls 13 of the cells 4. This makes the honeycomb cellular structure 9 reaction softer at the beginning of the impact, because the sidewalls 13 substantially deform in an elastic manner.

Figures 8A, 8B, 8C:
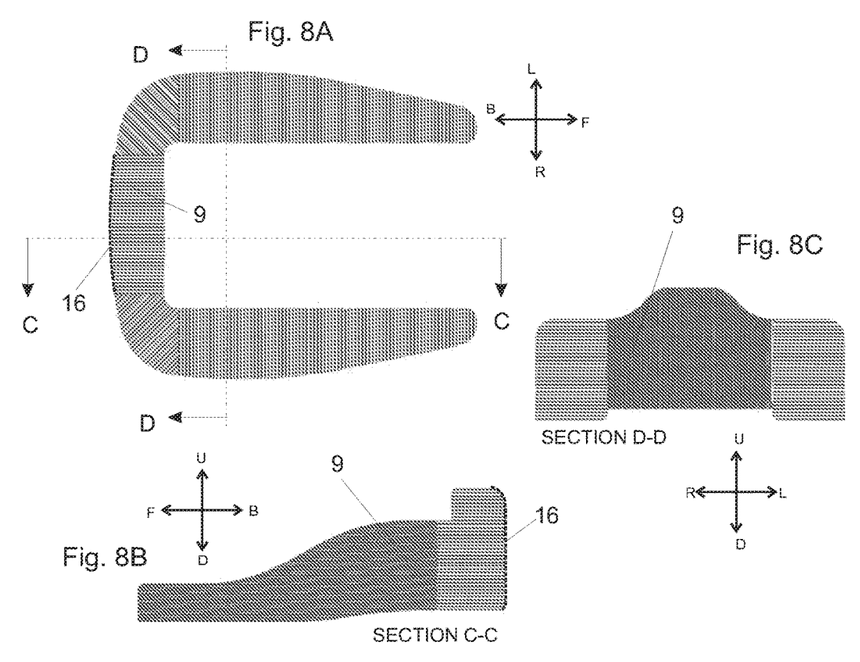
FIG. 8A shows a top view of a second embodiment of the energy-absorbing member according to the present invention.
FIG. 8B shows a cross-sectional view of the energy-absorbing member of FIG. 8A, sectioned according to plan C-C.
FIG. 8C shows a cross-sectional view of the energy-absorbing member of FIG. 8A, sectioned according to plan D-D.

As already described, the cells 4 are preferably tubes. These tubes 4 have a circular cross-section as represented in FIGS. 4, 7, 8. Alternatively, the cross-section of the cells/tubes 4 can be a square, a hexagon, a non-uniform hexagon, a re-entrant hexagon, a chiral truss, a diamond, a triangle or an arrowhead. Substantially, said tube 4 has open upper and lower bases having a shape constituted by a closed broken and/or curved line. In particular, the cross-section of the cells/tubes can be shaped so that the honeycomb cellular structure 9 exhibits a monoclastic or synclastic behaviour. Alternatively, the cells 4 can be the cells of a lattice structure that is not tubular or any hollow structure having a regular or irregular geometry. The tubes 4 can be welded each other via their sidewalls 13, Alternatively, the tubes can be bonded by means of adhesive layers interposed between adjacent sidewalls 13. The tubes 13 can be connected so as to minimize the gap between adjacent tubes.

When the cells 4 have a circular cross-section, the outer diameter of the circular cross-section can range between 2.5 and 8 mm, and the wall thickness of said cells 4 can range between 0.05 and 0.2 mm. According to these dimensional values, the energy absorption is optimized. Furthermore, these values allow to have a very light headrest 1.

In a particular embodiment, the honeycomb cellular structure 9 can comprise an upper and/or lower sheet layer 16. Said sheet layer 16 can be a polymeric fabric firmly attached to the front edges of said open cells 4 through a heat-activated adhesive. For realizing this firm, almost indissolubly, connection, the polymeric fabric is arranged over a side or both sides of the honeycomb cellular structure 9 so as to cover the front edges of the open cells. The assembly so obtained is then heated at a temperature of activation of the adhesive. In this way, the adhesive permeates across the fibers of the fabric 16 and around the edges of cells 4. The fabric 16 remains firmly connected to the cells 4 so that if a load is applied on the fabric 16, the fabric spread it on a plurality of cells, even if the load is applied punctually. The fabric 16 drags more cells 4 in the crumpling, enlarging the quantity of cells 4 involved in the absorption of the impact. The fabric 16 also allows a perspiration of the assembly since the air continues to flow through the cells 4. The heat-activated adhesive can be a thermoset polyester web film adhesive.

FIGS. 5 and 6 shows a racing car 10 comprising an open cockpit 11 wherein a driver 20 can sit. In the racing cars, the driver 20 wears a helmet 30. Said racing car 10 comprises a headrest 1 according to the present invention that is anchored to the car body 12 as described above.

Concluding, the invention so conceived is susceptible to many modifications and variations all of which fall within the scope of the inventive concept, furthermore all features can be substituted to technically equivalent alternatives. Practically, the quantities can be varied depending on the specific technical requirements. Finally, all features of previously described embodiments can be combined in any way, so as to obtain other embodiments that are not herein described for reasons of practicality and clarity.

The invention claimed is:

1. Headrest for a racing vehicle comprising a cockpit wherein a driver wearing a helmet can sit, comprising:
    a flexible casing comprising connecting means configured to anchor the flexible casing to a vehicle body; and
    at least one energy-absorbing member comprising at least one honeycomb cellular structure arranged inside said flexible casing and at least one foam pad shaped so as to hold the at least one honeycomb cellular structure inside the flexible casing.

2. Headrest according to claim 1, wherein the honeycomb cellular structure comprises a plurality of interconnected open cells configured to absorb energy by plastic deformation in response to a longitudinal compressive load applied to said cells.

3. Headrest according to claim 2, wherein the longitudinal axes of the cells belonging to the same honeycomb cellular structure are parallel each other.

4. Headrest according to claim 2, wherein said longitudinal axes of the cells are oriented so that when the helmet of the driver hits the casing said cells are compressed along said longitudinal axes against the vehicle body.

5. Headrest according to claim 4, wherein the longitudinal axes of the cells are horizontal and oriented toward the helmet of the driver sitting in the cockpit.

6. Headrest according to claim 2, wherein the longitudinal axes of the cells are normal to a surface of the casing facing the helmet of the driver sitting in the cockpit.

7. Headrest according to claim 2, wherein the longitudinal axes of the cells are inclined of an angle that is smaller or equal to 45° with respect to a direction normal to a surface of the casing facing the helmet of the driver sitting in the cockpit.

8. Headrest according to claim 1, wherein the honeycomb cellular structures are at least three, at least one first honeycomb cellular structure is arranged in a portion of the flexible casing lying behind the helmet of the driver sitting in the cockpit and at least two second and third honeycomb cellular structures are respectively arranged in right and left portions of the flexible casing lying on the sides of the helmet of the driver sitting in the cockpit when the headrest is viewed from above.

9. Headrest according to claim 1, wherein the at least one foam pad comprises a recess to accommodate the at least one honeycomb cellular structure.

10. Headrest according to claim 9, wherein the at least one foam pad is externally shaped so as to match at least in part with inner side of the flexible casing.

11. Headrest according to claim 1, wherein the honeycomb cellular structure comprises an upper and/or lower sheet layer, preferably said sheet layer is connected to edges of said open cells through an adhesive, preferably a heat-activated adhesive.

12. Headrest according to claim 1, wherein the casing of the headrest is shaped so as to partially surround the helmet of the driver sitting in the cockpit when the headrest is viewed from above.

13. Headrest according to claim 1, wherein the casing comprises a flexible layer made of a composite material, preferably made of Kevlar.

14. Headrest according to claim 1, wherein the connecting means comprise at least one quick-lock connector attached to the flexible casing and configured to reversibly fix the casing to the vehicle body, and/or one or more male/female connectors configured to engage respective one or more female/male elements belonging to the vehicle body so as to realize a male-female connection between the casing to the vehicle body.

15. Racing car comprising a car body, an open or closed cockpit wherein a driver wearing a helmet can sit and a headrest according to claim 1 anchored to said car body.

16. Headrest according to claim 2, wherein each cell comprises a tube having a sidewall and a longitudinal axis, and the cells are connected each other through their sidewalls.

17. Headrest according to claim 5, wherein the longitudinal axes of the cells are oriented according to a left-and-right direction or to a front-and-back direction.

18. Headrest according to claim 7, wherein said angle is comprised between 5° and 35°.

* * * * *